United States Patent [19]
Robinson, Jr. et al.

[11] 3,906,852
[45] Sept. 23, 1975

[54] HAY BALER KNIFE ADJUSTMENT

[75] Inventors: Edward L. Robinson, Jr.; Ralph E. Beyer, both of Memphis, Tenn.

[73] Assignee: International Harvester Company, Chicago, Ill.

[22] Filed: Nov. 27, 1974

[21] Appl. No.: 527,571

[52] U.S. Cl. ............................... 100/98 R; 100/179
[51] Int. Cl.² .......................................... B30B 15/08
[58] Field of Search ........................... 100/98 R, 179

[56] References Cited
UNITED STATES PATENTS

| | | | |
|---|---|---|---|
| 2,720,160 | 10/1955 | Tice et al. ......................... | 100/98 R |
| 2,923,230 | 2/1960 | Bornzin ............................ | 100/98 R |
| 3,059,569 | 10/1962 | Nolt .................................. | 100/98 R |
| 3,249,040 | 5/1966 | van der Lely ..................... | 100/98 X |
| 3,552,307 | 1/1971 | Venable ............................ | 100/98 R |

Primary Examiner—Billy J. Wilhite
Attorney, Agent, or Firm—Neal C. Johnson; Floyd B. Harman

[57] ABSTRACT

A hay baler including an elongated bale chamber and a power-driven plunger reciprocably mounted in the chamber for cyclically compressing hay in the chamber. Hay is fed into the chamber through a feed opening in a sidewall thereof by a feed mechanism operated in synchronization with reciprocating movement of the plunger. A knife is mounted on the sidewall adjacent to the feed opening. Another knife is mounted on the plunger so as to be movable thereby in close cutting relation with the sidewall-mounted knife to cut the hay at the feed opening. The synchronized movement of the plunger and the feed mechanism is provided in part by a rack and pinion drive wherein an elongated rack is slidably mounted on the outside of the bale chamber and connected to the plunger for conjoint reciprocation. The rack drives a pinion which in turn drives the feed mechanism. Adjustment of the position of the knives relative to each other is accomplished from the outside of the bale chamber by shifting the rack, plunger, and attached knife to position the knife in proper cutting relation to the chamber-mounted knife.

6 Claims, 5 Drawing Figures

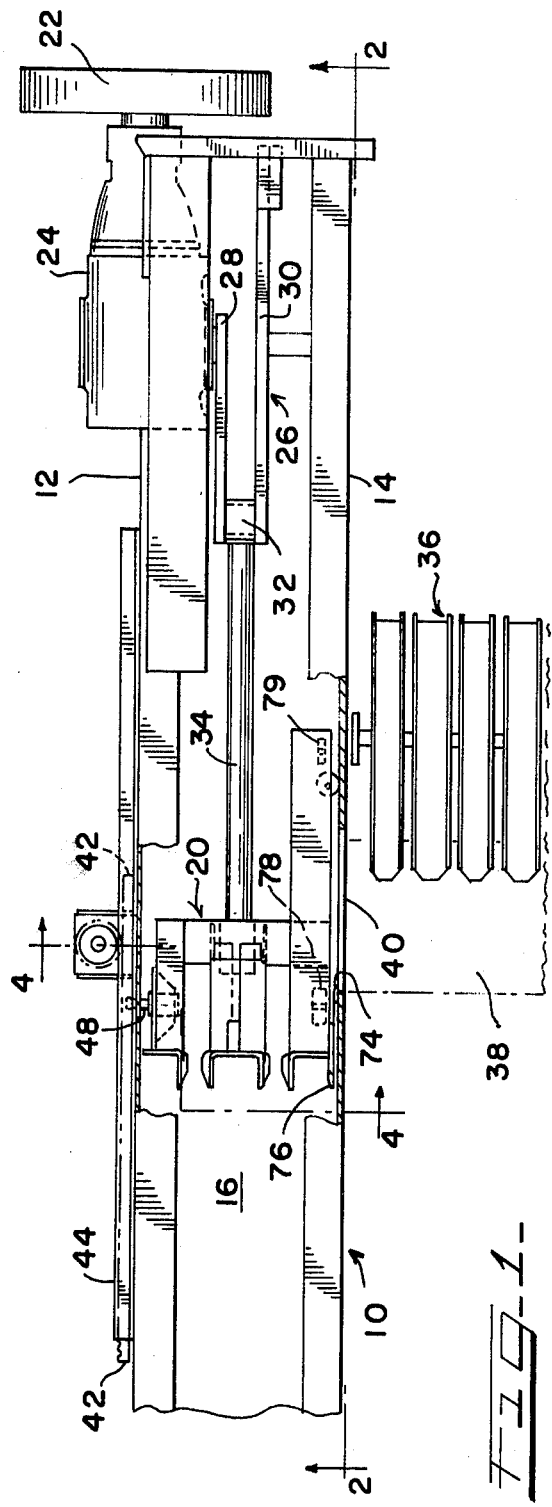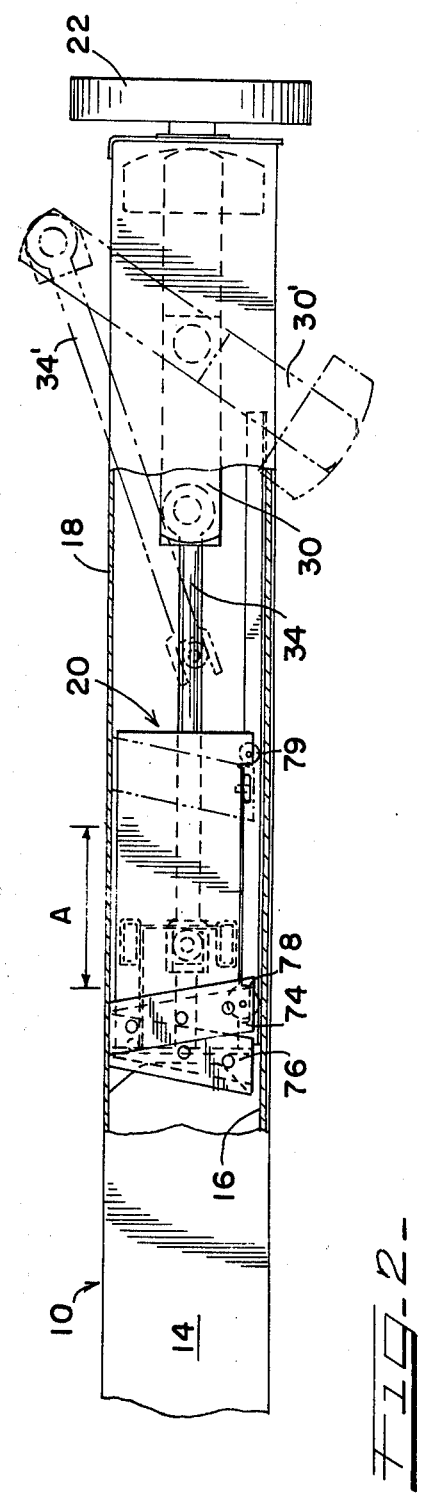

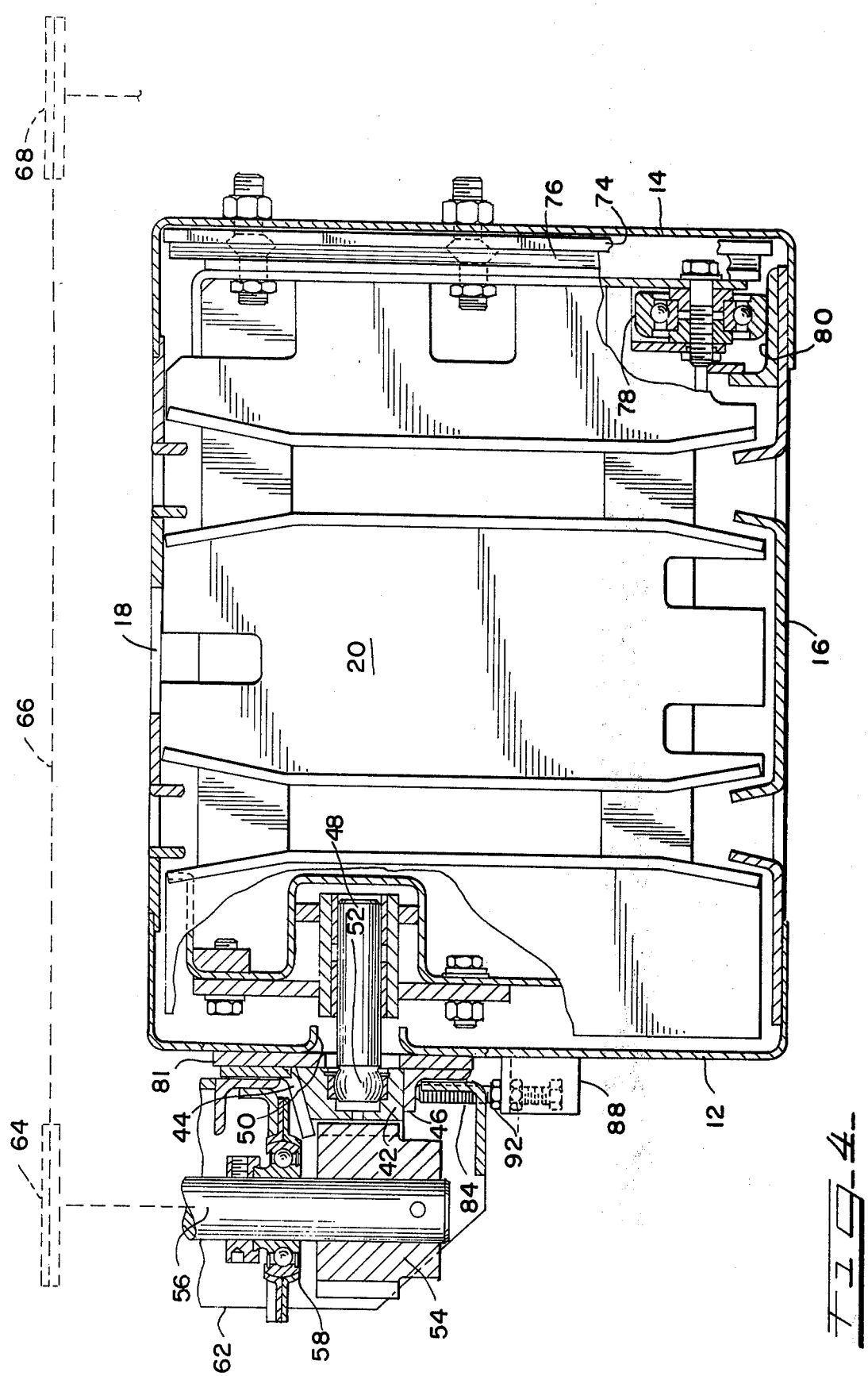

HAY BALER KNIFE ADJUSTMENT

BACKGROUND OF THE INVENTION

1. Field of the Invention

The invention relates to hay balers and more specifically to an improved means for adjusting the hay cutting knives relative to each other for optimum cutting of the hay fed into the bale chamber.

2. Prior Art

The art includes several patents showing various means for adjusting the baler plunger relative to the bale case for several reasons including maintaining an effective cutting relation between the pair of knives mounted on the plunger and bale case respectively. U.S. Pat. No. 3,059,569 and the patents cited therein adequately define the knife-adjustment problems and suggest several ways to maintain plunger and bale case alignment. Accordingly, a discussion of the reasons for maintaining knife adjustment and the problems associated therewith need not be set forth in detail herein.

The basic underlying problem is to design an effective machine at the lowest possible cost commensurate with the realities of competition. In the field of endeavor relating to hay balers, which includes several manufacturers producing a large annual volume of machines, considerations of cost effectiveness present difficult challenges particularly to those involved in the design and development phases.

Upon having recognized a specific probelm (such as knife adjustment) it is almost inevitable that a solution will require the provision of structure specially designed and constructed to solve the specific problem exclusively. Of course the resultant special structure adds its consequent cost to that of the machine. It is desirable therefore to achieve the solutions with a minimal amount of special and exclusive-use structure.

SUMMARY

The present invention relates to improvements in hay balers wherein hay is fed into the bale chamber cyclically in timed relation to reciprocation of the plunger through a drive structure including a rack reciprocably driven by the plunger. Incoming hay is severed from the source of supply by a knife mounted on the plunger acting against a knife mounted on the bale chamber. Adjustment of the knives relative to each other to maintain effective cutting action is accomplished in significant part by adjusting the position of the rack vertically on the bale chamber.

The principle advantage is the utilization of a portion of the hay feed drive system (that is, the rack) as a means for adjusting the knives for effective cutting action. The capability of the rack is thus converted from single-function to multiple-function. The provision of exclusive use structure is thus minimized and costs are reduced.

It is an object of the invention to provide a hay baler wherein the plunger-mounted knife may be accurately adjusted relative to the bale chamber-mounted knife to optimize cutting effectiveness.

Another object commensurate with the foregoing object is to minimize costs by creating multiple-use structure rather than exclusive-use structure.

More specifically, it is an object to utilize a portion of the hay feed drive system as a means for adjusting the plunger with the result that this multiple-use will result in cost savings.

BRIEF DESCRIPTION OF THE DRAWINGS

FIG. 1 is a fragmentary plan view of portions of a hay baler utilizing the plunger knife adjustment feature of the invention;

FIG. 2 is a fragmentary side elevation view taken along lines 2—2 of FIG. 1;

FIG. 4 is an enlarged sectional view through the baler taken along lines 4—4 of FIG. 1.

DESCRIPTION OF THE PREFERRED EMBODIMENT

Figure 3:
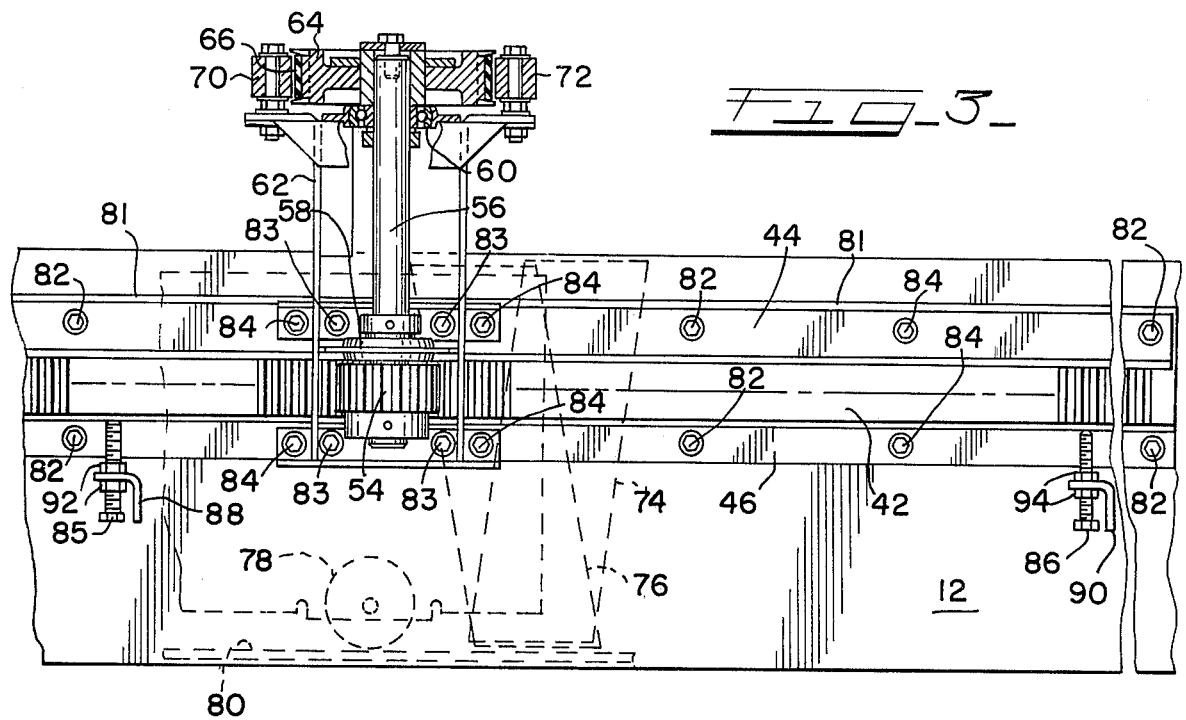
FIG. 3 is a fragmentary enlarged side elevation of a portion of the feed mechanism drive and plunger adjustment structure.

Referring first to FIGS. 1 and 2 there is shown some of the basic structure of a hay baler adapted for towing behind a PTO-equipped tractor for picking up windrowed hay and forming successive compacted and tied bales. The baler includes a longitudinally extending bale chamber 10 of generally rectangular section including opposite sidewalls 12 and 14, a bottom wall 16, and a top wall 18. A plunger 20 is slidably mounted within the bale chamber 10 for reciprocation in hay-compression and return strokes.

The plunger 20 is power driven from the towing tractor through suitable shafting (not shown) coupled to a flywheel 22. The power is transferred from the flywheel 22 through a gear type transmission 24 to a crank assembly 26. The crank assembly 26 includes parallel arms 28 and 30 interconnected and journalled at 32 to a pitman 34 pivotally connected to the plunger 20.

In accordance with usual construction the baler includes a hay pickup shown partially at 36 for lifting the windrowed hay upwardly and then rearwardly onto a cross feed platform shown partially at 38. A feed mechanism (not shown) is driven from the plunger 20 for feeding the hay into the bale chamber 10 through an opening 40 in the sidewall 14 in timed relation to movement of the plunger. Typically the feed mechanism would comprise a track-mounted reciprocable carriage supporting a plurality of depending teeth for moving the hay from the platform 38 through the opening 40. The opening 40 has a longitudinal dimension designated A in FIG. 2.

The feed mechanism is driven from the plunger 20 through a system to be now described. An elongated toothed rack 42 of trapezoidal section is slideably mounted between upper and lower guide tracks 44 and 46 respectively supported on the exterior of the chamber wall 12. The rack 42 is directly connected to the plunger 20 by a pin 48 secured to the plunger as shown in FIG. 4. The pin 48 projects through an elongated slot 50 defined through the wall 12. The pin 48 includes a spherical head 52 providing a ball and socket type connection with the rack 42 which permits limited angular adjustment therebetween.

As shown generally in FIG. 3 a pinion gear 54 is meshed with the toothed rack 42 so as to be rotated in response to reciprocation of the rack. The pinion gear 54 is secured on a vertical shaft 56 which is journalled in a pair of ball bearing units 58 and 60. The bearing units 58 and 60 are secured to a box frame 62 bolted to the tracks 44 and 46. A toothed pulley 64 is secured to the top end of the shaft 56 above the top wall 18 of the bale chamber. An endless flexible ribbed belt 66 is shown in section in FIG. 3 trained about the pulley 64. As shown schematically in FIG. 4 the belt 66 is adapted to extend from the pulley 64 in parallel runs to a pulley 68 mounted on the baler proximate to the outer end of the platform 38 (FIG. 1). The above-mentioned feed mechanism is secured to one of the runs of the belt 66 so as to be reciprocated thereby. In the preferred embodiment a pair of belt guide rollers 70 and 72 (FIG. 3) is mounted on the frame 62 to prevent the belt 66 from jumping the teeth on the pulley 64 to thus maintain the feed mechanism in proper timed movement relative to the plunger 20.

As shown generally in FIGS. 1 and 2 and more specifically in FIG. 4, the baler includes a pair of knives 74 and 76 bolted to the chamber sidewall 14 and plunger 20 respectively. The knife 74 is mounted adjacent to the hay feed opening 40 in position to effect cutting of incoming hay when the plunger-mounted knife 76 is moved rearwardly therepast on a compression stroke of the plunger. In accordance with conventional practice the plunger 20 is rollably supported for reciprocation on a plurality of rollers including a roller 78 journalled on the plunger proximate to the knife 76 and a roller 79 at the other end of the plunger. The rollers 78 and 79 engage an elongated track member 80 (FIG. 4) secured to the bottom wall 16.

A feature of the present invention resides in the provision of simple and effective means for adjusting the vertical position of the rack 42 to adjust the parallel clearance between the knives 74 and 76 without effecting the performance of the rack in its principal function of driving the feed mechanism.

It will be understood with reference to FIG. 3 that the tracks 44 and 46 support the rack 42 throughout its range of reciprocation. The rack 42, tracks 44 and 46, and the box frame 62 are interconnected and supported relative to the bale chamber in the following manner. As shown generally in FIG. 3 and in section in FIG. 4, an elongated and slotted wear plate 81 is disposed adjacent to the exterior of the sidewall 12. The plate 81 is slotted to receive the pin 48 therethrough. The tracks 44 and 46 are secured to the wear plate 81 by a plurality of recessed-head bolts 82. In the preferred embodiment of the invention there are six such bolts 82 connecting each of the tracks 44 and 46 to the wear plate 81. The box frame 62 is secured to the assembled tracks 44 and 46 and the wear plate 81 by four recessed-head bolts shown at 83. The subassembly provided by the rack 42, tracks 44 and 46, wear plate 81, and box frame 62 is vertically adjustably secured to the sidewall 12 by a plurality of carriage bolts 84 disposed alternately between the recessed-head bolts 82 along the length of the bale chamber. The bolts 84 secure the above mentioned subassembly to the sidewall 12 through elongated holes (not shown) thus enabling the subassembly to be vertically movable when the carriage bolts 84 are loosened.

The track 46 is of right angle section (FIG. 4) permitting a pair of adjustment bolts 85 and 86 to engage the flange portion of the track. The bolts 85 and 86 are threadedly mounted on brackets 88 and 90 respectively, secured to the sidewall 12. The bolts 85 and 86 are adjustably retained on the brackets by respective sets of lock nuts 92 and 94.

In normal baling operation the toothed rack 42 is reciprocated by the pin-connected plunger 20 thus rotating the shaft 56 in alternate directions through the driving connection with the pinion gear 54. This drives the pulley 64 in alternate directions thereby driving the runs of the belt 66 back and forth. The feed mechanism attached to one of the runs of the belt 66 is thus reciprocated in timed relation to the plunger for feeding hay through the opening 40 for baling. The rack 42 thus performs its principal function.

Figure 5:
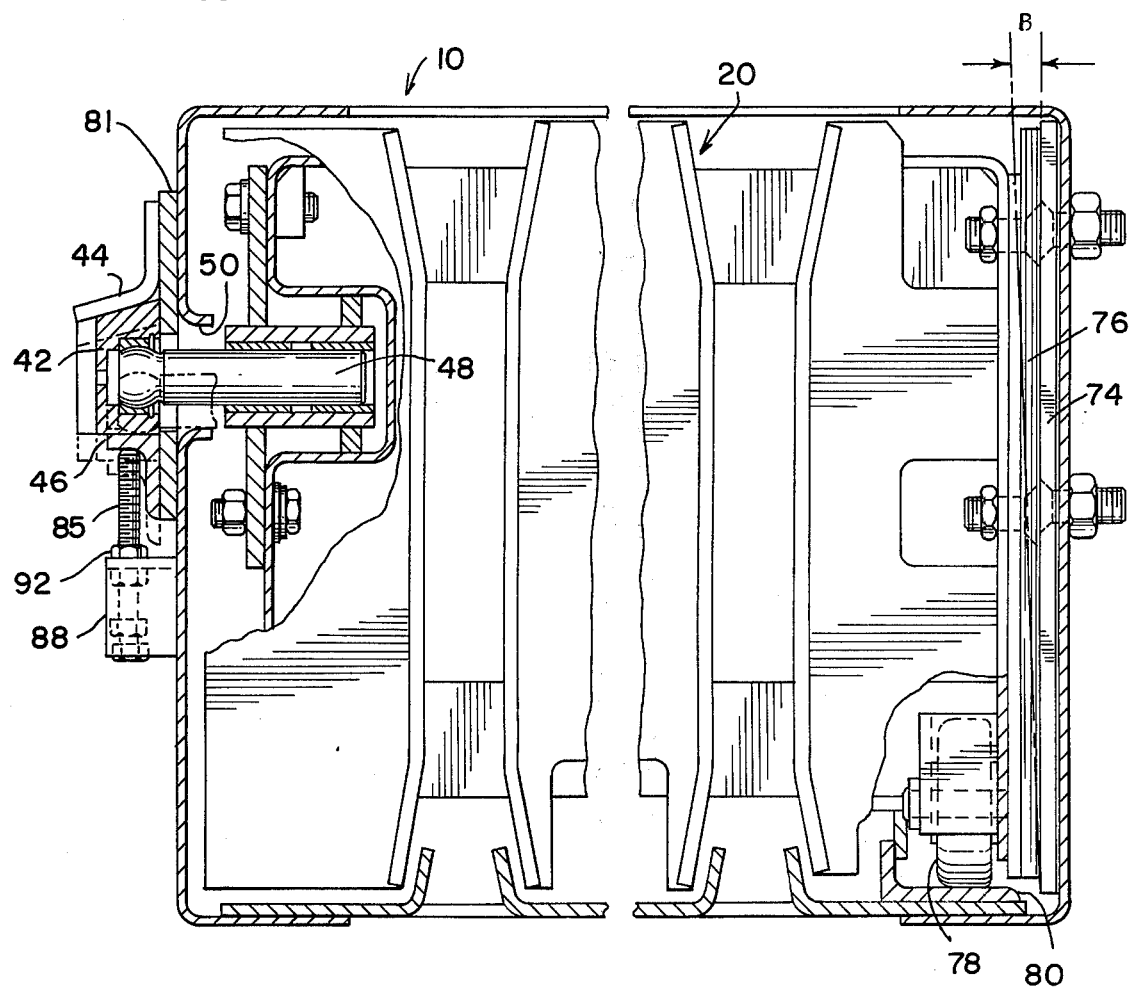
FIG. 5 is a schematic view through the bale chamber illustrating the range of adjustment of the plunger-mounted cutting knife.

Through normal use and wear the cutting clearance between the knives 74 and 76 will increase, necessitating adjustment. In the present invention the adjustment is relatively simple. The carriage bolts 84 and the lock nuts 92 and 94 are loosened. The bolts 85 and 86 are adjusted relative to the respective brackets 88 and 90 to raise or lower the rack 42. Through the pin (48) connection to the plunger 20, the plunger is thus pivoted about a fulcrum established by the rollers 78 and 79 on the track 80. As shown in an exaggerated angle B in FIG. 5, the plunger-mounted knife 76 is thus shiftable relative to the wall-mounted knife 74 to provide the proper parallel clearance. The spherical head (52) connection between the pin 48 and the rack 42 permits some angulation to occur therebetween if necessary to provide the knife adjustment. It will be seen that movement of the plunger 20 to achieve the proper cutting relationship of the knives does not effect any change in the driving relationship between the rack 42 and pinion 54 since both elements are shifted unitarily. Once the proper cutting clearance is established between the knives the lock nuts 92 and 94 and the carriage bolts 84 are tightened.

By the foregoing Applicants have provided an improved knife adjustment for balers well suited to achieve the objects of the invention.

What is claimed is:

1. In a hay baler having a bale chamber defined in part by a pair of opposite vertical sidewalls, a feed opening defined through one of the sidewalls by which hay is introduced into the bale chamber, an elongated knife disposed vertically on said one sidewall along an edge of said feed opening, a plunger reciprocably mounted within the bale chamber for cyclically compressing hay therein received through the feed opening, an elongated knife mounted on the forward edge of the plunger so as to be moved therewith in close cutting relation to the knife on said one sidewall for cutting hay received through the feed opening, in combination with the improvement comprising:

an elongated rack connected to said plunger and reciprocably mounted on the outside of said bale chamber on the sidewall opposite to said one sidewall;

and means for vertically adjusting the position of said rack on said opposite sidewall to thus move said plunger-mounted knife relative to said sidewall-mounted knife to provide optimum cutting clearance therebetween.

2. The subject matter of claim 1, wherein said rack is supported between parallel top and bottom tracks on said opposite sidewall, said bottom track being supported on a plurality of bolts, said bolts being adjustable to raise and lower said bottom track and said rack supported thereon.

3. The subject matter of claim 1, wherein said rack is connected to said plunger by means including an elongated slot defined through said opposite sidewall parallel to the direction of reciprocation of the plunger, a pin secured to said plunger and projecting outwardly through said slot, and a ball and socket connection between said pin and said rack to accommodate relative movement between said plunger and rack during adjustment of the vertical position of said rack.

4. In a hay baler having a bale chamber of generally rectangular cross section including a horizontal bottom wall and a pair of vertical opposite sidewalls, a feed opening defined through one of said sidewalls by which hay is fed into the chamber, a generally vertically disposed knife mounted on said one sidewall adjacent to said feed opening, a plunger reciprocably mounted in said bale chamber for cyclically compressing hay therein received through said feed opening, a generally vertically disposed knife mounted on said plunger to effect hay cutting action with said sidewall-mounted knife when moved therepast with said plunger, in combination with the improvement comprising:
- an elongated guide track mounted on said bottom wall within said bale chamber;
- rollers on said plunger supporting said plunger for movement on said guide track;
- an elongated rack connected to said plunger and reciprocally mounted on the outside of said bale chamber on the sidewall opposite to said one sidewall;
- and means for vertically adjusting the position of said rack on said opposite sidewall to pivot said plunger about said rollers on said guide track thereby providing an adjustment of said plunger-mounted knife relative to said sidewall-mounted knife to optimize cutting effectiveness therebetween.

5. The subject matter of claim 4, wherein said rack is supported between the parallel top and bottom tracks on said opposite sidewall, said bottom track being supported on a plurality of bolts, said bolts being adjustable to raise and lower said bottom track and said rack supported thereon.

6. The subject matter of claim 4, wherein said rack is connected to said plunger by means including an elongated slot defined through said opposite sidewall parallel to the direction of reciprocation of the plunger, a pin secured to said plunger and projecting outwardly through said slot, and a ball and socket connection between said pin and said rack to accommodate relative movement between said plunger and rack during adjustment of the position of said rack.

* * * * *